US012113686B2

(12) United States Patent
Juneja et al.

(10) Patent No.: US 12,113,686 B2
(45) Date of Patent: Oct. 8, 2024

(54) PREDICTING NETWORK ANOMALY EVENTS

(71) Applicant: JPMorgan Chase Bank, N.A., New York, NY (US)

(72) Inventors: Garima Juneja, London (GB); Wanpeng Liu, Carshalton (GB); David D. Lin, Tuxedo Park, NY (US); Harsh Bhattachar, Marlboro, NJ (US); Bing Zhang, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/076,138

(22) Filed: Dec. 6, 2022

(65) Prior Publication Data

US 2024/0187321 A1   Jun. 6, 2024

(51) Int. Cl.
  *H04L 43/067*   (2022.01)
  *H04L 41/16*    (2022.01)
  *H04L 43/16*    (2022.01)

(52) U.S. Cl.
  CPC ............ *H04L 43/067* (2013.01); *H04L 41/16* (2013.01); *H04L 43/16* (2013.01)

(58) Field of Classification Search
  CPC ..... H04L 43/067; H04L 43/106; H04L 43/16; H04L 41/16; H04L 41/064; H04L 41/147; G06N 3/0455
  See application file for complete search history.

(56) References Cited

U.S. PATENT DOCUMENTS

| | | | |
|---|---|---|---|
| 2020/0311603 A1* | 10/2020 | Qiu | G06N 5/04 |
| 2020/0382361 A1* | 12/2020 | Chandrasekhar | G06N 3/044 |
| 2020/0387797 A1* | 12/2020 | Ryan | G06N 3/084 |
| 2021/0014102 A1* | 1/2021 | Singh | H04L 41/064 |
| 2021/0374027 A1* | 12/2021 | Joglekar | G06F 11/076 |
| 2022/0103444 A1* | 3/2022 | Ranjan | H04L 43/106 |
| 2023/0015709 A1* | 1/2023 | Bisht | H04L 41/147 |
| 2023/0038164 A1* | 2/2023 | Naeini | G06N 5/022 |
| 2023/0236818 A1* | 7/2023 | Saeki | G06N 3/0455 |
| | | | 717/172 |

* cited by examiner

*Primary Examiner* — Jungwon Chang
(74) *Attorney, Agent, or Firm* — Greenblum & Bernstein, P.L.C.

(57) ABSTRACT

In one example, a method for prediction future network anomaly events is disclosed. The method includes generating a machine learning model for a computer communication network. Generation of the machine learning model can be by applying a historical set of time series data metrics of the computer communication network to train the machine learning model. The method may determine a data metric threshold that indicates a limit for future data metrics associated with the computer communication network. The method may analyze current data metrics associated with the computer communication network, and predict a future time when the data metrics associated with the computer communication network will meet or exceed the data metric threshold value. The method may flag the prediction of the future time to avoid a network anomaly.

14 Claims, 9 Drawing Sheets

January 1, 2015

| Time | 9:00 am | 9:30 | 10:00 | 11:00 | 11:30 | 12:00 pm | 12:30 | 1:00 | 1:30 | 2:00 | 2:30 | 3:00 | 3:30 | 4:00 | 4:30 | 5:00 |
|---|---|---|---|---|---|---|---|---|---|---|---|---|---|---|---|---|
| Memory Utilization (%) | 50 | 51 | 62 | 59 | 73 | 58 | 65 | 70 | 77 | 68 | 55 | 56 | 74 | 82 | 55 | 55 |
| CPU Utilization (%) | 3 | 5 | 93 | 18 | 22 | 25 | 28 | 95 | 84 | 93 | 22 | 17 | 14 | 11 | 8 | 3 |
| No of Logged-In Users | 50 | 52 | 60 | 66 | 60 | 65 | 65 | 70 | 66 | 60 | 54 | 50 | 50 | 48 | 47 | 45 |
| Disk Utilization (%) | 10 | 12 | 14 | 11 | 11 | 16 | 19 | 22 | 22 | 24 | 20 | 99 | 25 | 22 | 10 | 11 |

400 — 404 Memory Utilization (%), 406 CPU Utilization (%), 408 No of Logged-In Users, 410 Disk Utilization (%)

November 25, 2022

| Time | 9:00 am | 9:30 | 10:00 | 11:00 | 11:30 | 12:00 pm | 12:30 | 1:00 | 1:30 | 2:00 | 2:30 | 3:00 | 3:30 | 4:00 | 4:30 | 5:00 |
|---|---|---|---|---|---|---|---|---|---|---|---|---|---|---|---|---|
| Memory Utilization (%) | 53 | 73 | 82 | 85 | 80 | 59 | 69 | 79 | 89 | 65 | 62 | 76 | 56 | 59 | 78 | 87 |
| CPU Utilization (%) | 9 | 15 | 36 | 46 | 56 | 54 | 63 | 73 | 72 | 75 | 76 | 79 | 85 | 85 | 82 | 79 |
| No of Logged-In Users | 200 | 250 | 500 | 600 | 650 | 655 | 755 | 800 | 850 | 800 | 700 | 700 | 900 | 950 | 900 | 855 |
| Disk Utilization (%) | 30 | 32 | 55 | 55 | 60 | 64 | 75 | 76 | 76 | 77 | 74 | 73 | 81 | 85 | 85 | 85 |

402 — 412 Memory Utilization (%), 414 CPU Utilization (%), 416 No of Logged-In Users, 418 Disk Utilization (%)

FIG. 4A

| Network Event Data | Host Name | Short Description | Support Group | Resolved Comments | Status Indicator | Time Stamp |
|---|---|---|---|---|---|---|
| 1 | www.abc.com | Application URL not working | Support13 | Duplicate, reported due to high disk utilization | False Positive | 1:30pm |
| 2 | def.abc | Database service stopped | Support13 | Duplicate, reported due to high disk utilization | False Positive | 1:31pm |
| 3 | geh.abc | Disk Utilization | Support13 | Disk space Increased | Active Indicator | 1:32pm |
| 4 | LOB | System job failure | Support10 | Process restarted | Active indicator | 3:10pm |
| 5 | Fin_LOB | Users unable to open data file | Support10 | Reported due system job failure | False indicator | 3:12pm |

FIG. 4B

PREDICTING NETWORK ANOMALY EVENTS

BACKGROUND

One reason for the ubiquity of cloud computing is microservice architecture. Microservices offer well-defined modules of code that can be containerized and reused for different functions. And with microservices, developers can create new capabilities without writing code from scratch.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

FIG. 4A illustrates tables showing historical time series data metrics according to examples of the present disclosure.

FIG. 4B illustrates a table showing network event data according to examples of the present disclosure.

DETAILED DESCRIPTION

Figure 1:
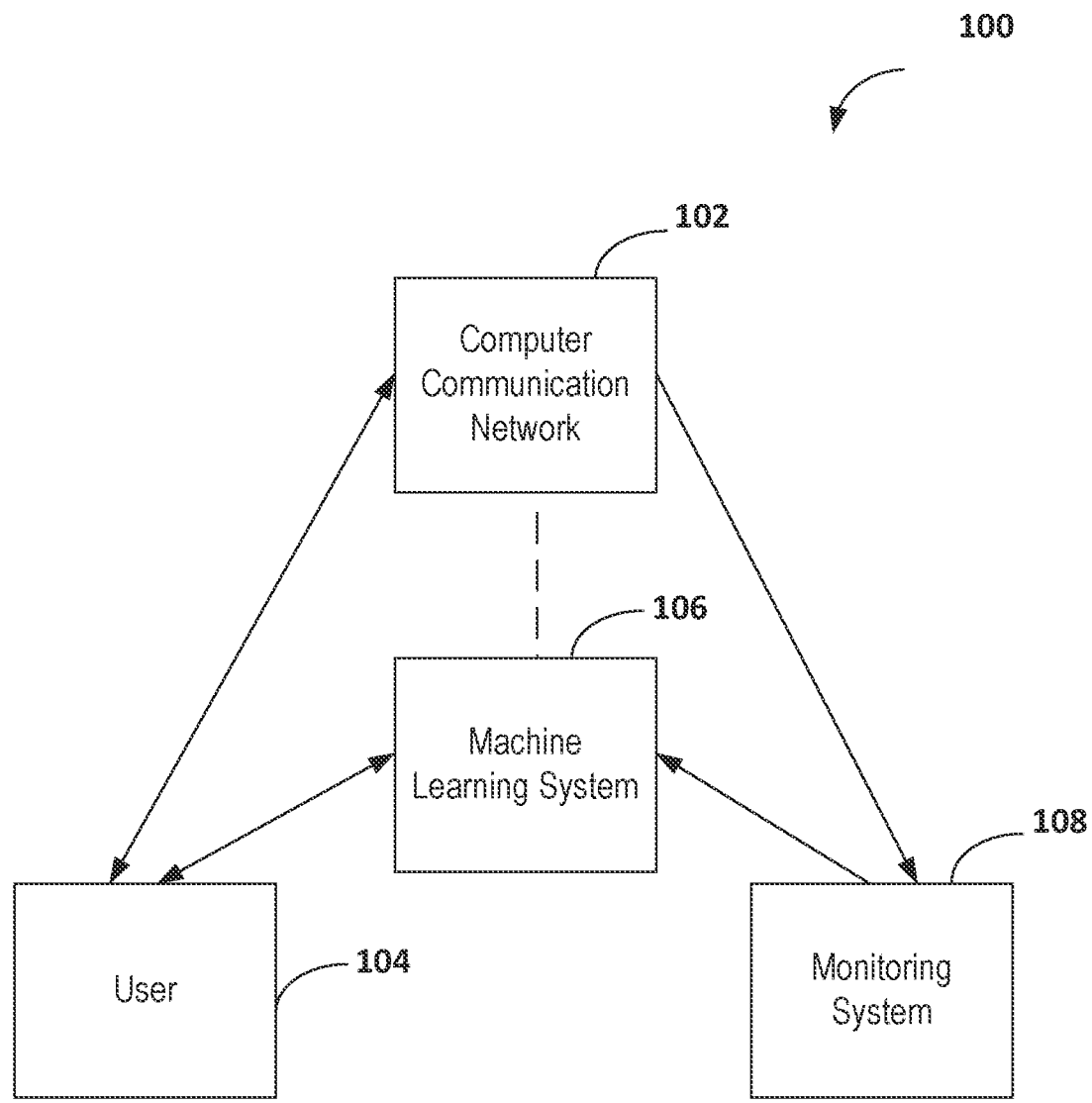
FIG. 1 illustrates an enterprise event data communication platform according to an example of the present disclosure.

As noted above, microservices can be deployed on multiple containers. As such, the number of enterprise applications that can be deployed on a cloud service has increased exponentially. This exponential shift to microservices has various consequences. The failure of any single dependence has a significant impact on the upstream performance of the network because of the many microservices that are running and that are dependent on each other. Critical issues may happen in real time where a network event such as a network component failure triggers the failure of another network component.

For example, an end user seeking services from a business entity may attempt to interact with the enterprise web page only to discover that the web page is down. The web page may be down for a multiplicity of reasons ranging from front end issues and application crashes to back end issues and data loss. A software or user support engineer can spend inordinate amounts of time sifting through vast amounts of information to pinpoint the problem.

Eventually, the network problem is resolved but at the expense of network downtime. Users cannot operate as normal and are prevented from executing necessary applications. In fact, this situation becomes cyclical—a network problem occurs, followed by network downtime, followed by resolution of the network problem by support engineers. Support engineers are constantly reactive, reacting to resolve a network problem after the fact, after the network problem has already occurred.

Accordingly, examples of the present disclosure address the foregoing by providing a method of predicting network anomaly events in a computer communication network. In one example, the method generates a machine learning model for the computer communication network by applying a historical set of time series data metrics to train the machine learning model. Here, such historical set of time series data metrics may include resource metrics such as CPU utilization metric, a disk utilization metric and/or a memory utilization metric.

The method of the present disclosure may then set a data metric threshold to indicate a limit for future data metrics associated with the computer communication network. The method monitors or analyzes current data metrics associated with the computer communication network.

The method then predicts, using the machine learning model, a future time when the data metrics associated with the computer communication network will meet or exceed the data metric threshold value set for the computer communication network, and then flags the prediction of the future time to avoid a network anomaly. In an example, the method may apply historical network anomaly event data to train the machine learning model; and then predict a future time when a network anomaly event will occur based on the historical network anomaly event data.

In this manner, software or user support engineers are not reactive, that is, they are not reacting to resolve a network problem after the fact, after the network problem has already occurred. And, support engineers need not spend inordinate amounts of time sifting through vast amounts of information to determine the root cause of an anomaly network incident, particularly in a microservices architecture cloud environment where many microservices are dependent on each other.

The system and method of the present disclosure is predictive, avoiding network anomaly events before they occur. Support engineers can take remedial action before a network anomaly event occurs. Network downtime is significantly reduced and users can continue to execute necessary applications to accomplish their daily tasks.

FIG. 1 illustrates an enterprise event data communication platform 100 according to an example of the present disclosure.

In FIG. 1, enterprise network data communication platform 100 may facilitate the communication of network data to a machine learning system 106 for analysis and prediction of network anomalies. In one implementation, the network data may be data metrics associated with computer communication network 102. In another implementation, the network data may relate to an incident, an alert or a request related to computer communication network 102. In one example, the network data may be network event data that is captured as records or tickets that are acted upon by a support engineer such as user 104. Note that as used herein, the term "implementation" and the term "example" are used interchangeably.

Here, computer communication network 102 can be any communication system that allows point-to-point communication between two or more end points of all data types including audio, video, etc., and any associated metadata. The communication system may comprise a combination of one or more of the Internet and cloud services for the execution of microservice applications. As an example, computer communication network 102 may comprise the Internet, one or more cloud services, etc., associated with an entity that provides products and services to consumers. As shown, the computer communication network 102 of is itself communicably coupled to user 104, and machine learning system 106, and a monitoring system 108.

In operation, as implied by its name, monitoring system 108 generates, monitors, and stores data metrics associated with computer communication network 102 to detect and prevent future network anomaly events on the computer communication network 102. Here, monitoring system 108 may track, examine and store multiple hardware data metrics associated with the network. Examples of such data metrics are CPU utilization, the number of logged users, memory utilization, disk utilization, etc.

Monitoring system 108 may be a single or a combination of enterprise application monitoring software and/or platforms. As an example, monitoring system 108 can be Grafana™, Jira™, ServiceNow™ and/or Prometheus™. The data metrics from monitoring system 108 may be time series data metrics, that is, a sequence of data collected over constant time intervals such as daily, monthly, quarterly or yearly, for example.

Monitoring system 108 feeds the time series data metrics to machine learning system 106. At setup, machine learning system 106 uses such historical sets of time series data metrics associated with the computer communication network 102 for learning and training. Once the learning phase is completed, machine learning system 106 may detect future network anomaly events to prevent network downtime and all of the related difficulties.

In another implementation, when an anomaly network event or incident occurs in computer communication network 102, monitoring system 108 may detect the anomaly network event to create network event data. The anomaly network event may be provided to user 104. The user 104 can communicate with computer communication network 102 to receive information about network events on computer communication network 102. The user 104, alone or in conjunction with monitoring system 108, can then create a ticket or network event data relating to such network events.

User 104 can then utilize the network event data to engage the machine learning system 106 in lieu of or in addition to the data metrics. In one implementation, user 104 is a single computer device representing an enterprise software engineer or support staff. In another example implementation, user 104 may include a multiplicity of computing support devices representing an entire information system support infrastructure for computer communication network 102.

Figure 2:
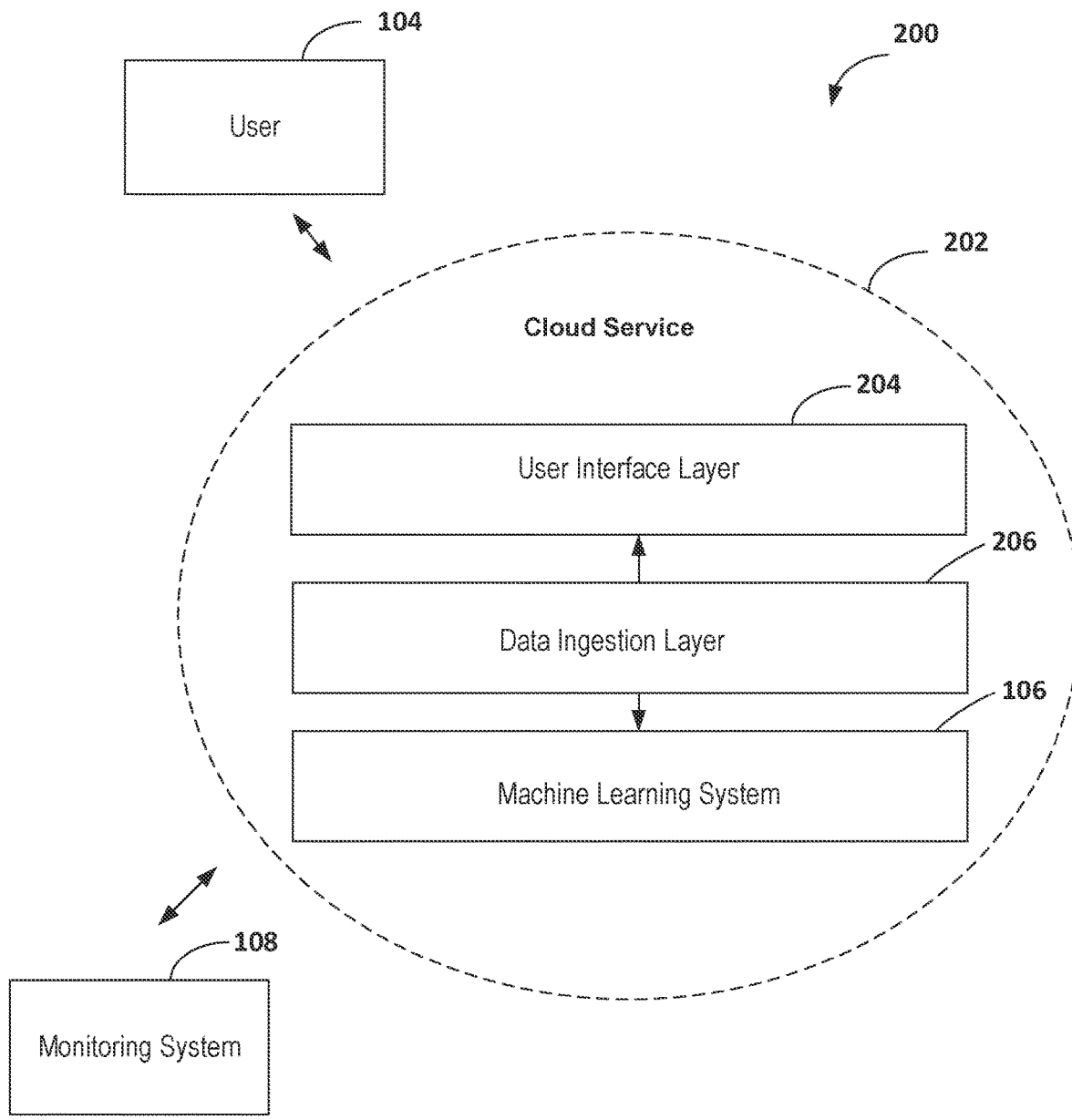
FIG. 2 illustrates a data ingestion architecture to ingest data into the machine learning system 106 (FIG. 1) according to an example of the present disclosure.

FIG. 2 illustrates a data ingestion architecture 200 to ingest data into the machine learning system 106 (FIG. 1) according to an example of the present disclosure.

In this example, data ingestion architecture 200 is implemented within a cloud service 202. In FIG. 1, the cloud service 202 can be a public cloud service, a private cloud service, or a hybrid (public/private) cloud service. For example, the cloud service 202 can be a public cloud such as AWS™ that is owned and/or operated by a public cloud vendor, in order to provide the services of the cloud to subscribers and customers. While cloud service 202 is illustrated as a single cloud service, the cloud computing environment can include additional cloud services, and the arrangement and components of such a cloud computing environment can vary.

As used herein, a "cloud" or "cloud service" can include a collection of computer resources that can be invoked to instantiate a virtual machine, application instance, process, data storage, or other resources for a limited or defined duration, in one example, within a microservices architecture. The collection of resources supporting a cloud can include a set of computer hardware and software configured to deliver computing components needed to instantiate a virtual machine, application instance, process, data storage, or other resources.

For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine.

A further group of computer hardware and software can host and serve applications to load on an instantiation of a virtual machine, such as an email client, a browser application, a messaging application, or other applications or software. Other types of computer hardware and software are possible.

Here, in FIG. 2, as can be seen, cloud service 202 includes a user interface layer 204, which is itself layered over a data ingestion layer 206. In turn, data ingestion layer 206 is layered over machine learning system 106.

Figure 3:
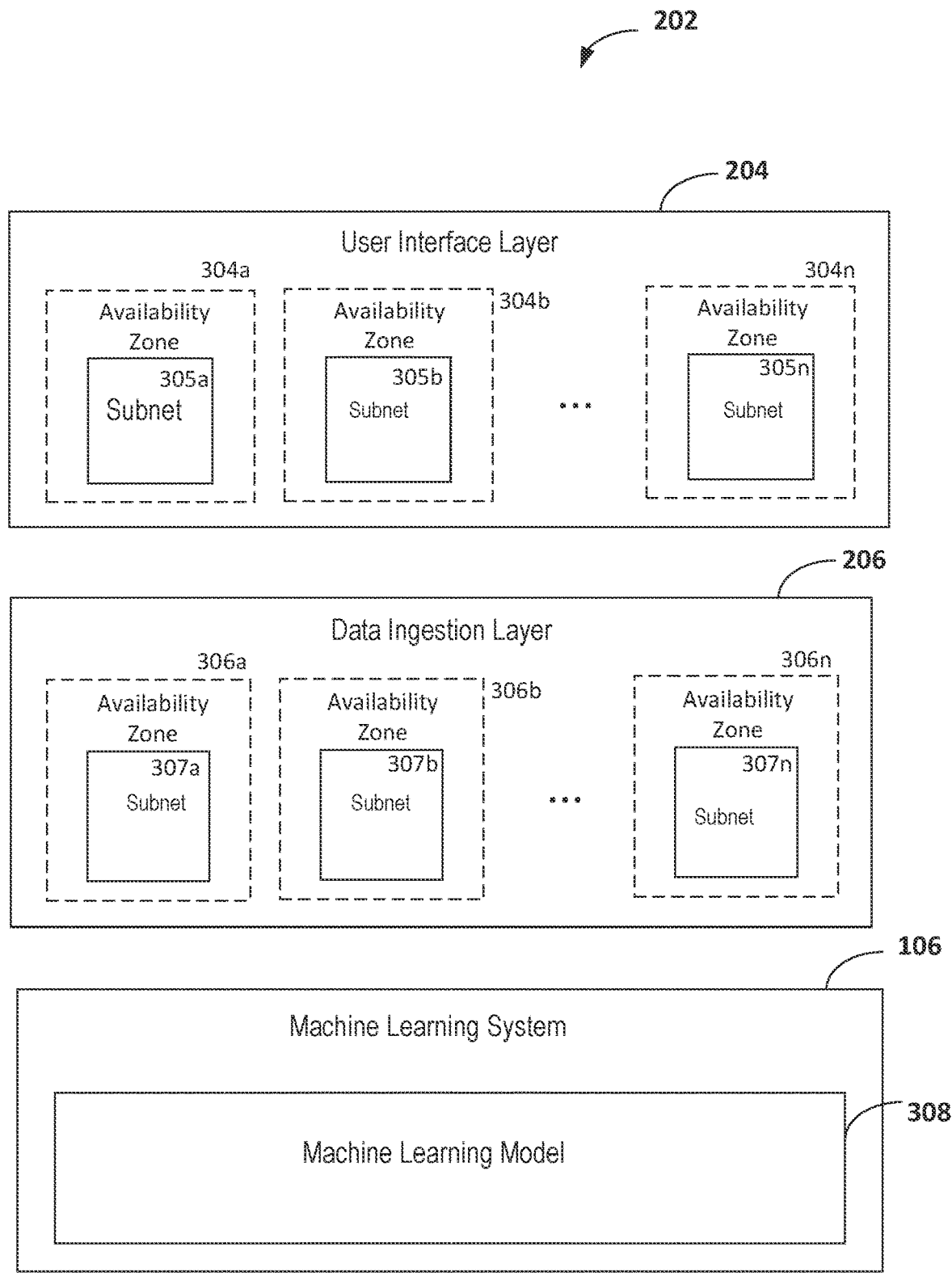
FIG. 3 illustrates example components of the user interface layer, the data ingestion layer and the machine learning system of the cloud service of the data ingestion architecture of FIG. 2.

The machine learning system 106 is itself comprised of a machine learning model 308 (FIG. 3). Machine learning system 106 receives network data from data ingestion layer 206 for processing by the machine learning model 308.

Data ingestion layer 206 operates by receiving network data from several sources including monitoring system 108 and user 104 also in FIG. 1. The network data may be data metrics and/or network anomaly event data, such as, relating to the occurrence of an abnormal event on computer communication network 102 (FIG. 1). Here, data ingestion layer 206 receives the network data, processes the data, transforms, validates, analyzes, sanitizes and/or normalizes the network data for ingestion by machine learning system 106.

In one implementation, the data ingestion layer 102 itself may receive the network data from monitoring system 108, which can include multiple sources of event data with differing data types. Data ingestion layer 102 is efficient as transforming the network data into consistent data types.

Although not shown, the data ingestion layer 206 may include other layers. For example, the data ingestion layer 206 may include a data collector layer, data processing layer, data storage layer, data query layer and/or data visualization layer. The data types may also be real-time, batches or a combination of both.

As shown in FIG. 3, in one implementation, data ingestion layer 206 may be deployed within a virtual private cloud that includes a plurality of availability zones 306a, 306b, . . . 306n each with a respective corresponding subnet 307a, 307b, 307n to increase the resiliency of data ingestion layer 206. Thus, the same application may be deployed in different availability zones in the event that a system failure occurs in one availability zone (in a data center), another availability zone would remain operational.

As previously noted, in FIG. 2, the data ingestion architecture 200 may include UI (user interface) layer 204 that provides network status information to users (e.g., user 104).

The network status information may convey recommendations or actions taken about a network anomaly event and the like.

As an example, user 104 may be a business owner seeking to review information about an application outage. The UI layer 204 receives the application outage information (e.g., time of occurrence, number of impacted users, etc.) from the data ingestion layer 206 for display to UI layer 203. Any recommendations (e.g., increasing the number of instances) may also be provided for viewing. As another example, user 104 may be a production management team that is reviewing a data crash to determine causation, and take the appropriate corrective action. Although not shown, user 104 in conjunction with monitoring system 108 may provide network data for consumption by machine learning system 106.

As shown in FIG. 3, in one implementation, UI layer 204 may be deployed within a virtual private cloud that includes a plurality of availability zones 304a, 304b, . . . 304n to facilitate resiliency. Each respective availability zone 304a 304b, . . . 304n may further include a subnet 305a, 305b, . . . 305n.

FIG. 4A illustrates a table 400 and a table 402 showing historical time series data metrics for use with examples of implementations of the present disclosure.

In the example of FIG. 4A, the historical time series data metrics are generated by monitoring system 108 (FIG. 1). The historical time series data metrics are sequences of data measurements associated with the computer communication network 102. The data metrics may indicate the performance, quality, health, or available resource of a system at any point in time. The historical time series data metrics create a machine learning model to recognize data patterns associated with the computer communication network 102 and to predict future network anomalies.

Here, the computer communication network 102 is analyzed to measure the associated historical time series data metrics. In one example, as in table 400 and table 402, the historical time series data metrics are hardware resource metrics that indicate the availability of a hardware resource for use by components of computer communication network 102 or external components. In another example, the historical time series data metrics may be work metrics that indicate the health of the communication network. Although not shown in tables 400 and 402, examples of such work metrics include throughput (the amount of work done per unit time), latency the time required to complete work, etc. In another example, in addition to or in lieu of the historical time series metrics, network event data may also be captured as further discussed below.

Referring to tables 400 and 402 of FIG. 4A, examples of such resource data metrics are shown. The resource data metrics may include Memory 404 measured in GB (Gigabytes) to indicate the amount of memory that is used, CPU Utilization 406 measured as a percentage (%) of available CPU resources, No of Logged-in Users 408, and Disk Utilization 410 measured as a percentage of available disk space. These are but examples of hardware resource metrics; other examples are possible.

Here, the resource data metrics are taken at constant intervals of 30 minutes, daily. For example, on Jan. 1, 2015, the initial data metric is measured at 9:00 am, followed by another data metric at 9:30 a until the final metric is determined at 5:00 pm. Although not shown, the historical time series data metrics may be continuous and measured around the clock for 24 hours with appropriate intervals for a more comprehensive data set.

The historical time series data metrics can be for many years, here as shown, from Jan. 1, 2015 through Nov. 25, 2022 (Table 402). Once all of the historical time series data metrics are examined, they can be utilized as a training set for the machine learning model 308 as further described with reference to FIG. 5 below.

The historical time series data metrics may involve sequences that are meaningful only in context, and may be undetectable by mere observation. Such sequences may occur within a single day's time series data metric. For example, in table 400, the amount of memory 404 that is utilized at 2:30 pm, 3:00 pm and 3:30 pm respectively is: 5 GB, 6 GB and 4 GB. The system may recognize this memory sequence of 5 GB, 6 GB, 4 GB as abnormal because memory use for this sequence exceeds other time periods for that day or for subsequent days.

And, if an anomaly event does occur around 3:00p, the sequence is recognized. As another example, in table 400, the CPU Utilization 406 at 1:00 pm is 45.5%. While this may be within an acceptable threshold, the system may flag this increase particularly if anomaly events have occurred around the same time.

The historical time series data metrics may also involve sequences that occur from day-to-day. For example, on Nov. 25, 2022, the time series data metrics are captured in table 402. In the United States, November 25 is the day after Thanksgiving and typically a gigantic shopping day. On or about this day, the network always experiences heavy traffic since the network supports an e-commerce shopping infrastructure (e.g., a payment system).

This heavy traffic is reflected in the historical time series data metrics of table 402, where for example, the No. of Logged-In Users 416 at 9:00 am is 200. On a regular non-shopping designated day, the number of Logged-In Users may be 50. (See e.g. the No. of Logged-in Users 410 at 9:00 in table 400). This increase in the number of users represents a four-fold increase from prior days. In fact, in table 402, the number of logged-in users 416 at 4:00 pm is 950, representing a 20-fold increase relative to a typical day. The CPU Utilization 414 also reflects increased user activity, and is as high as 85% at 4:00 pm. The machine learning model 308 (FIG. 3) evaluates the data metrics, flags the increased traffic, predicts such increases, sends out appropriate alerts and in some cases, automatically scales up the number of instances to accommodate the increased traffic. As another example, although not shown, on the 15th day of each month CPU/Memory utilization may abruptly increase and exceed 85% because on the 15th of every month, discounts may be offered to customers during a particular time window, which increases the application load during that specific time window.

In conjunction with historical time series data metrics, network event data may also be utilized for predicting anomaly events before such events occur. When a network event occurs (e.g., enterprise website application not loading), user 104 generates a corresponding network event data or ticket related to the occurrence of the network event. Here, table 430 (FIG. 4B) shows five network event data, namely, network event data 1, 2, 3, 4 and 5. For network event data 1, shown in row 1 of table 430, the host name on which the incident occurred is "www.abc.com," as shown. The short description of the incident is "Application URL not working." The support group responsible for the host name is "Support13." The resolved comments are "Duplicate, reported due to high disk utilization." The network event data includes a status indicator of "False Positive," and the timestamp shows that the event occurred at 1:30 pm. Similarly, information for network data events 2, 3, 4 and 5 are shown on the table.

Correlation of Network Data Events to Recognize False Positive and Active/Main Alerts: The network data events 1, 2, 3, 4 and 5 of table 430 (FIG. 4B) can be correlated by user 104 for analytics to facilitate the determination of which network events/indicators are false positive and which ones are main/active indicators. By "correlated" or "correlation," it is meant that common attributes or relationships between the network events are identified and a single active or main indication remains in one group with multiple false indications.

As an example, a common attribute or relationship between network event data 1 and network event data 2 is the time of occurrence, as shown by the timestamp. Both network events occur proximate to each other, one at 1:30 pm and the other at 1:31 pm. As another example, network event data 1 and network event data 2 have the same support group namely "Support13."

Once the common attributes are identified, the network event data can be segregated into groups based on the common attributes that are identified. In one example, the network event data is segregated based on a single common attribute. In another example, the network event data is segregated based on all the multiple common attributes that are identified.

Thus, in FIG. 4B, table 430, correlation, network event data 1, 2 and 3 are segregated into a single group because they have the same attributes. That is, network event data 1, 2 and 3 have the same support group, i.e., Support13 and the network events occurred around the same time, i.e., network event data 1 occurred at 1:30 p; network event data 2 occurred at 1:31 pm and network event data 3 occurred at 1:32 pm.

Based on further analysis, user 104 then determines which of the three network event data is an active (or main) indicator or event. User 104 has sufficient experience based on prior incidents based on historical data, for example, to know which events are active indicators and which ones are false positive. In this case, network event data 3 is determined to be the active alert while network event data 1 and network event data 2 are false positive indicators.

As used herein, the term "false positive" is to identify an indicator, indication, event, or alert related to an abnormal network event that occurs in the computer communication network 102 because of the occurrence of another abnormal event. As used herein, the term "active" or "main" is to identify an indicator, indication, event, or alert related to an abnormal network event that occurs in the computer communication network 102 that can trigger the occurrence of other abnormal events. Resolution of the network incident related to the active alert then closes the associated false positive indicators or network event data.

Similarly, in table 430, for correlation, network event data 4 and 5 are segregated into a single group. Network event data 4 and 5 have the same support group, i.e., Support10 and their occurrence is proximate in time, i.e., network event data 4 occurred at 3:10 pm; network event data 5 occurred at 3:12 pm. Similarly, network event data 4 is determined to be the active indicator while network event data 5 is false positive. Once the network event data are correlated into patterns of active and false positive network event data, the correlated patterns can be utilized as a training set for the machine learning model 308.

Figure 5:
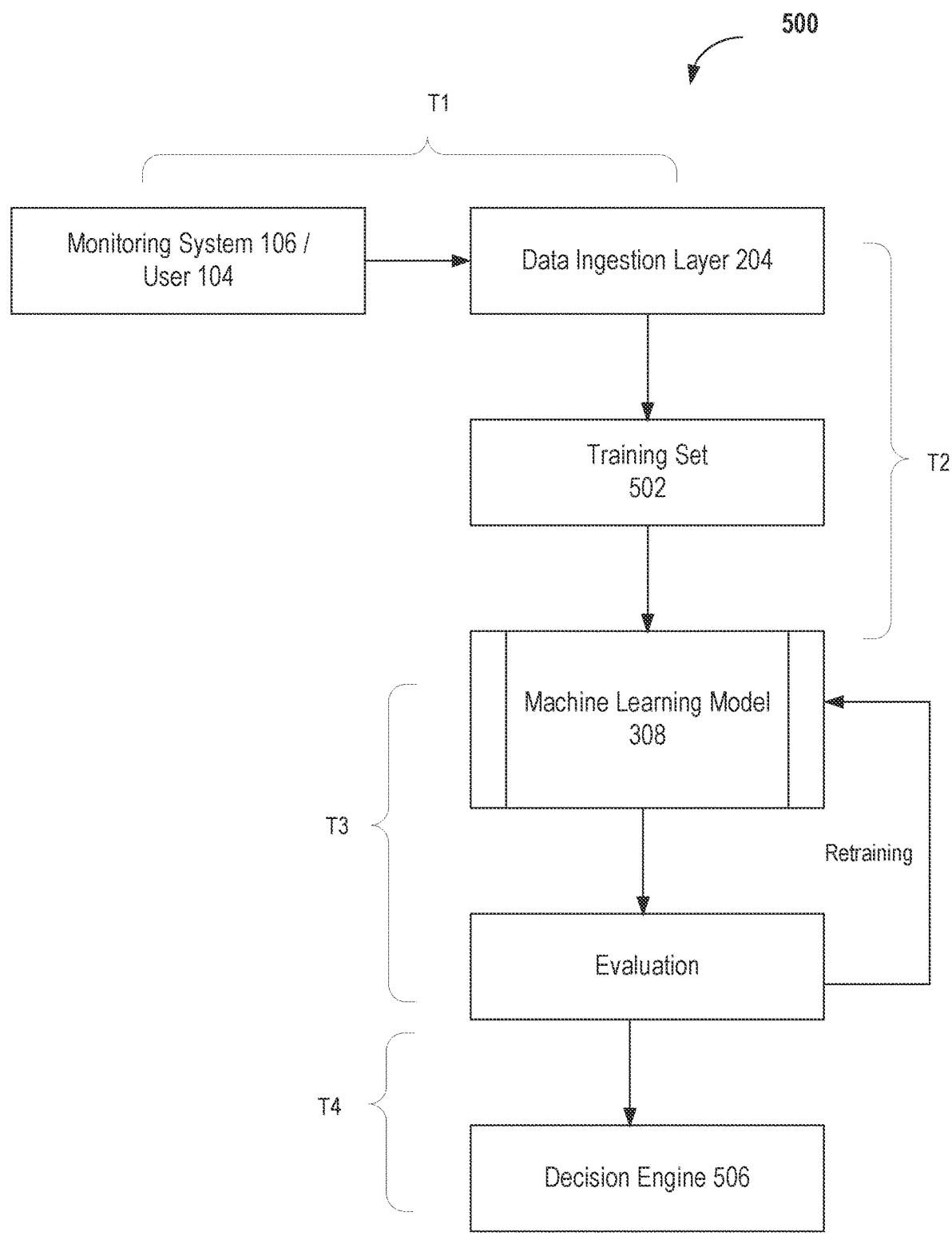
FIG. 5 illustrates a sequence flow diagram to set up the machine learning model of FIG. 3 according to an example of the present disclosure.

FIG. 5 illustrates a sequence flow diagram 500 to set up machine learning model 308 of FIG. 3 according to an example of the present disclosure.

At T1, monitoring system 106 and/user 104 feeds historical time series data metrics to the data ingestion layer 204. Here, reference to "historical time series data" may also include network event data in some implementations. At T2, the historical time series data metrics has been sanitized is used as a training set 502 to create and train machine learning model 308. The training set may include data patterns and sequences that are known to result in network anomaly events.

At T3, the machine learning model 308 is repeatedly evaluated at evaluation 504, and generating predictions based upon the evaluations, and adjusting outcomes based upon the accuracy of the predictions. In one example, the machine learning model 308 may learn through training by comparing predictions to known outcomes. As training progresses, the predictions of the machine learning model 308 may become increasingly accurate.

In an implementation, machine learning model 308 may be based on various classification methods for time series analysis models such as RF (Random Forest), Naïve model, Exponential Smoothing Model, ARIMA (Autoregressive Moving Average)/SARIMA (Seasonal Autoregressive Moving Average) and/or linear regression. In another implementation, machine learning model 308 may be based on machine learning methods such as multi-layer perceptron, recurrent neural network and/or long short-term memory. These are but examples and are not intended to limit the implementation of machine learning model 308.

At T4, once training and setup is complete, and evaluations become satisfactory, the machine learning model 308 is a decision engine 506 that can render decisions for subsequent network anomaly event data system (nonhistorical, real-time, etc.) to predict future anomaly events. In one example, network anomaly events associated with patterns and sequences in the historical time series data metrics are recognized and flagged before the occurrence of an anomaly network event. The decision engine 506/machine learning model 308 becomes increasing more accurate at predicting network anomaly events. Once a network anomaly event is predicted, support engineers, the production team, etc., can execute any remedial action (e.g., increasing disk space) to avoid a network anomaly event and prevent significant downtime to users.

Figure 6A:
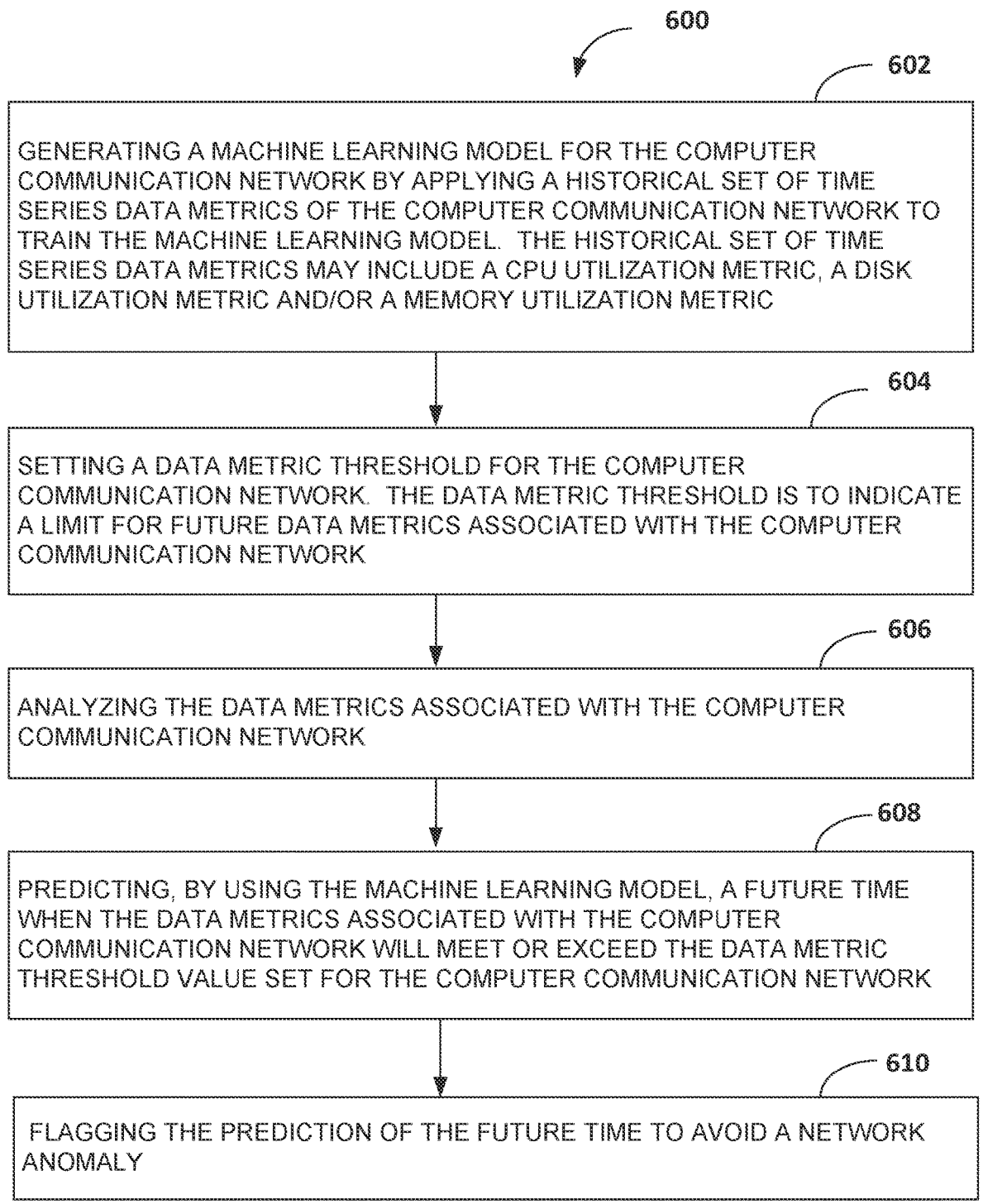
FIG. 6A illustrates a method of identifying false positive network event data according to an example of the present disclosure.

FIG. 6A illustrates a method 600 of predicting network anomaly events in a computer communication network 102 according to an example of the present disclosure.

At block 602, method 600 generates a machine learning model 308 for the computer communication network 102 (FIG. 1). The machine learning model 308 may be generated by applying a historical set of time series data metrics associated with the computer communication network 102 to train the machine learning model 308. Examples of the historical set of time series data metrics are shown in tables 400 and table 402. The historical set of times series data may be generated at intervals including seconds, minutes, hourly and daily for several years, etc. In fact, the historical set of time series data can be an aggregate or composite of the time series data metrics.

The historical set of time series data metrics can include CPU utilization 406 metric, disk utilization 410 metric and/or memory utilization 404 metric as shown in table 400, and CPU utilization 414 metric, disk utilization 418 metric and/or memory utilization 412 metric as shown in table 402.

Other types of data metrics may be utilized. Latency and throughput of the network may be employed, for example.

Moreover, the historical set of time series data metrics may also include network anomaly event data in addition to the CPU utilization 406 metric, disk utilization 410 metric and memory utilization 406. For some examples, the network anomaly event data may correspond to abnormal network events that occur during a sequence or pattern that is recognized by the machine learning model 308. The network anomaly event data may relate to an incident, system failure or anomaly in the computer communication network 102.

At block 604, method 600 sets a data metric threshold for the computer communication network 102. The data metric threshold may indicate a limit for future data metrics associated with the computer communication network 102. For example, a data metric threshold of 90% can be set for CPU utilization 406. A data metric threshold may also be set for other data metrics. As another example, the data metric threshold for disk utilization can be set to 87%.

At block 606, method 600 monitors or analyzes current data metrics associated with the computer communication network 102.

At block 608, method 600 uses the machine learning model 308 to predict a future time when the data metrics associated with the computer communication network 102 will meet or exceed the data metric threshold value determined for the computer communication network 102. In one example, an RF classification method can be used. An RF classification method is a collection of decision trees that can predict a future time to avoid a network anomaly. That is, each individual decision tree includes branches that classify the time series data according to their characteristics (e.g., year, month, day, time of occurrence). In an example, numerous time series data can be processed by the decision tree. Each time series data that is processed follows its specific path through the decision tree. Time series data having the same or similar characteristics will follow the same path within the classification tree.

Running such data through the decision tree thus leads to a learning phase to identify the specific branches of the tree that can be linked to a future time prediction. Such learning phase may take place based on building numerous decision trees with many branches each, including paths that discriminate among different time series data and predictions.

Figure 6B:
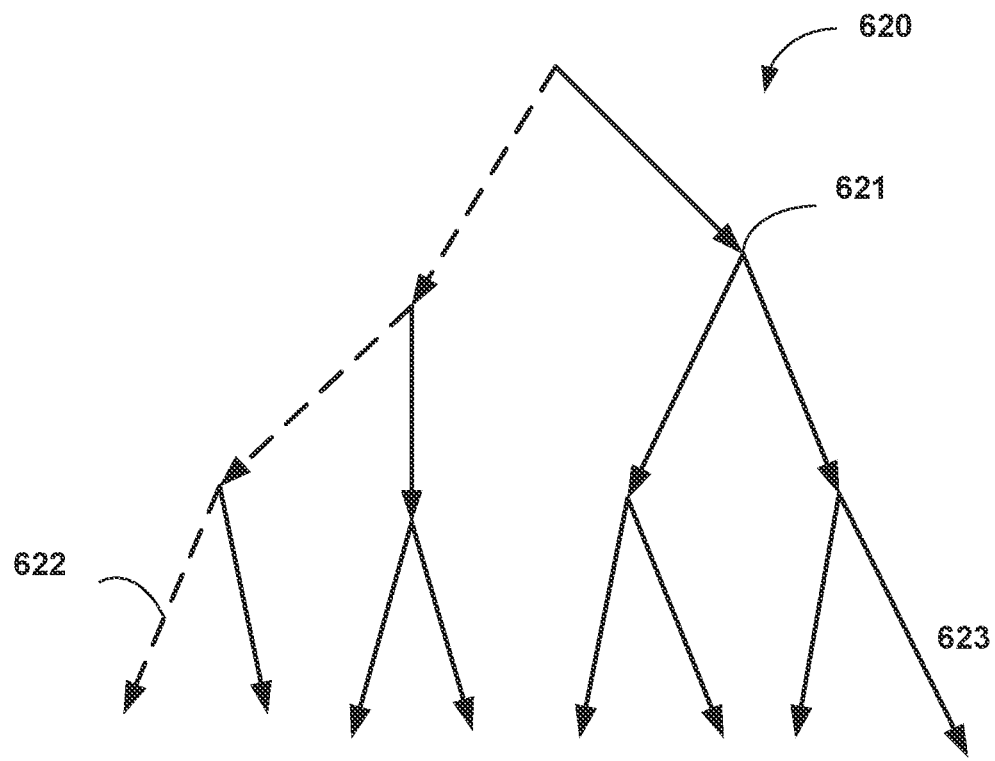
FIG. 6B illustrates a decision tree according to an example of the present disclosure.

FIG. 6B illustrates a decision tree 620 according to an example of the present disclosure. Path 623 is identified during the learning phase as corresponding to a future time prediction, path 622 is identified during learning as corresponding to another time prediction. At each intersection such as 621 a test such as for example "is the future time prediction accurate" is made. This is of course a symbolic representation and RF processing of future time predictions can be significantly more complex. In an example, RF processing builds a tree, whereby each branch of the tree represents a future time prediction of similar templates, whereby each branch is associated to a future time prediction. Classification may increase in precision as additional time series data are processed. This progressive process is referred to as the learning phase, whereby RF classification becomes increasingly more accurate at future predictions.

In one example, the prediction may indicate correspondence to a prior sequence or pattern that is identified by the machine learning model 308 as corresponding to a network anomaly event. In another example, the prediction can be made even no clearly identified sequence or pattern exists in the historical time series data metrics (e.g. based on exponential smoothing). Predictions may be based on thresholds set by identifying undesirable historical data metrics that may result in network down time.

Note that the result obtained after application of RF processing to obtain a prediction may also generate or be associated with a confidence level. A confidence level is an amount of certainty that the RF prediction will be correct. In one implementation, any prediction with a confidence level greater than 75% may be selected.

At block 610, method 600 may flag the future time prediction to avoid a network anomaly. Such a network anomaly may result in network downtime or a disruptive event that prevents users from executing applications or operating as normal.

In one example implementation, in addition to applying historical time series data metrics for training of machine learning model 308, method 600 can utilize historical network anomaly event data for training. Method 600 can then predict a future time when a network anomaly event will occur based on the historical network anomaly event data. The predicted time of occurrence of the network anomaly event and the predicted time when the current data metric will meet or exceed the data metric threshold can be proximate to each other. In other words, when the data metric threshold is exceeded, a network anomaly event may also occur.

As used herein, network anomaly event data refers to event data that relates to an abnormal incident, system failure, or anomaly in a computer communication system or network and any related alert, request, record or ticket thereof. The network anomaly event data may relate to a stopped database service, herein referred to as a network anomaly event. The network anomaly event data may relate to an application URL (Uniform Resource Locator) that is not working (network anomaly event). The network anomaly event data may relate to a stalled job process (network anomaly event). Other examples may relate to E-Commerce transaction issues, cloud service/content management system, connection issues, storage issues, CPU and memory utilization issues, node resource utilization. The afore-mentioned issues are not exhaustive. For example, network anomaly event data may also relate to long running DB queries and the request and response rate of an application.

Figure 7A:
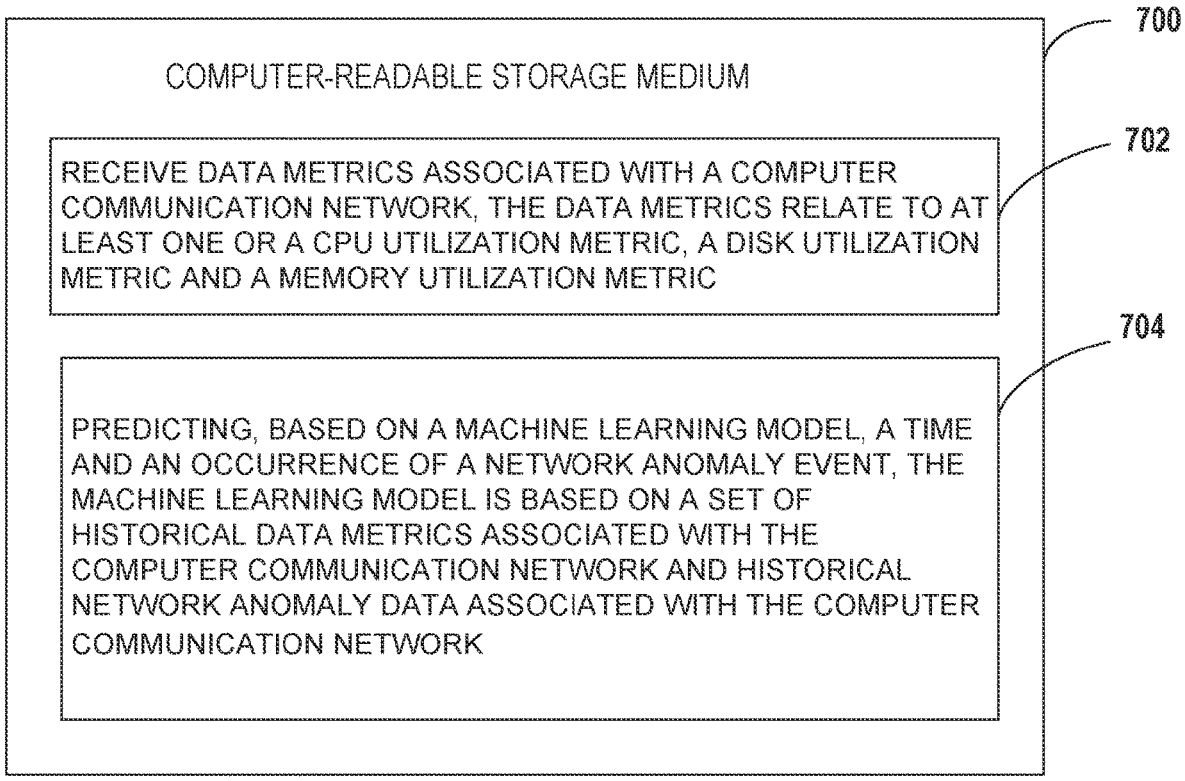
FIG. 7A illustrates a non-transitory computer-readable storage medium according to an example of the present disclosure.
Figure 7B:
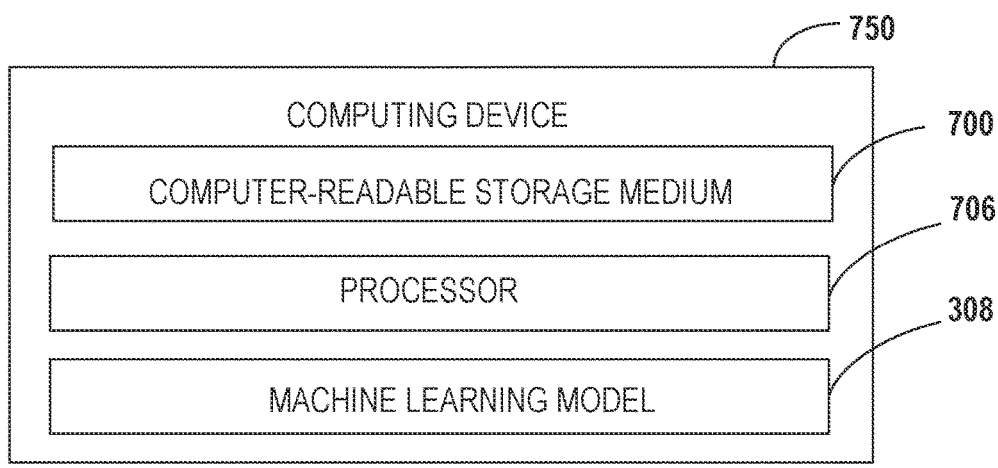
FIG. 7B illustrates a computing device according to an example of the present disclosure.

FIG. 7A illustrates example instructions stored on a non-transitory computer-readable storage medium 700 to predict network anomaly events according to one example of the present disclosure, and FIG. 7B illustrates an example computing device 750 according to the present disclosure.

As shown in FIG. 7A, the non-transitory computer-readable storage medium 700 includes instruction 702 and instruction 704. Instruction 702 may cause a processor 706 to receive data metrics associated with computer communication network 102. The data metrics can relate to a CPU utilization metric, a disk utilization metric and/or a memory utilization metric. Other data metrics and network event data may be employed.

Instruction 704 may predict, based on machine learning model 308 (FIG. 3), a time and an occurrence of a network anomaly event. Machine learning model 308 can be based on a set of historical data metrics associated with the computer communication network 102 and historical network anomaly data associated with the computer communication network 102.

Although not shown, the non-transitory computer-readable storage medium 700 may include an instruction to set a data metric threshold for the computer communication network 102. Here, the data metric threshold may indicate a limit for future data metrics associated with the computer communication network 102. The non-transitory computer-readable storage medium 700 may also include instructions to set the data metric threshold for memory utilization, and to set the data metric threshold for CPU utilization, disk utilization and memory utilization.

The non-transitory computer-readable storage medium 700 may be any electronic, magnetic, optical, or other physical storage device that stores executable instructions. For example, the non-transitory computer-readable storage medium 700 may be random access memory (RAM), an electrically-erasable programmable read-only memory (EEPROM), a storage drive, an optical disc, or the like. The non-transitory computer-readable storage medium 700 can be encoded to store executable instructions that cause the processor 706 to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, AngularJS, and Node.js) stack may be employed. In another example, a LAMP (Linux, Apache, MySQL, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including Python, C, C++, Java, JavaScript, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A method of predicting network anomaly events in a computer communication network, the method comprising:
generating a machine learning model for the computer communication network by applying a set of time series data metrics that is a sequence of hardware resource metrics collected over a constant time interval of the computer communication network to train the machine learning model, wherein the set of time series data metrics includes at least one of a CPU utilization metric, a disk utilization metric and a memory utilization metric,
wherein the machine learning model is trained by generating at least one training prediction using the set of time series data metrics and adjusting the machine learning model based on a comparison between the at least one training prediction and a known network event result;
determining a data metric threshold for the computer communication network, wherein the data metric threshold is to indicate a limit for future data metrics associated with the computer communication network;
analyzing the data metrics associated with the computer communication network;
predicting, by using the machine learning model, a future time when the data metrics associated with the computer communication network will meet or exceed the data metric threshold value set for the computer communication network; and
flagging the prediction of the future time to avoid a network anomaly.

2. The method of claim 1 further comprising applying network anomaly event data that includes a detection of a system failure or abnormal incident in the computer communication network to train the machine learning model; and
predicting a future time when a network anomaly event will occur based on the network anomaly event data.

3. The method of claim 2 wherein the network anomaly event includes a stopped database service.

4. The method of claim 2 wherein the network anomaly event includes an application URL not working.

5. The method of claim 1 wherein the data metric threshold is set for CPU utilization.

6. The method of claim 1 wherein the data metric threshold is set for disk utilization.

7. The method of claim 1 wherein the computer communication network is within a cloud service having a microservice architecture.

8. A non-transitory computer-readable storage medium with program instructions stored thereon, the program instructions when executed by one or more processors are operable to cause the one or more processors to perform operations comprising:
analyzing data metrics associated with a computer communication network, wherein the data metrics relate to at least one or a CPU utilization metric, a disk utilization metric and a memory utilization metric; and
predicting, based on a machine learning model, a time and an occurrence of a network anomaly event, wherein the machine learning model is based on a set of data metrics associated with the computer communication network and network anomaly event data associated with the computer communication network,
wherein the network anomaly event data includes a detection of a system failure or abnormal incident in the computer communication network, and wherein the machine learning model is trained by generating at least one training prediction using the set of data metrics and adjusting the machine learning model based on a comparison between the at least one training prediction and a known network event result.

9. The non-transitory computer-readable storage medium of claim 8 wherein the operations further comprise determining a data metric threshold for the computer communication network, wherein the data metric threshold is to indicate a limit for future data metrics associated with the computer communication network.

10. The non-transitory computer-readable storage medium of claim 9 wherein the data metric threshold is determined for memory utilization.

11. The non-transitory computer-readable storage medium of claim 9 wherein the data metric threshold is set for memory utilization, CPU utilization and disk utilization.

12. The non-transitory computer-readable storage medium of claim 8 wherein the network anomaly event includes a stalled job process.

13. A system comprising:
one or more processors; and
logic encoded in one or more non-transitory computer-readable storage media for execution by the one or more processors and when executed operable to cause the one or more processors to perform operations comprising:
generating a machine learning model for a computer communication network by:
applying a set of time series data metrics that is a sequence of hardware resource metrics collected over a constant time interval of the computer communication network to train the machine learning model, and
applying network anomaly event data that includes a detection of a system failure or abnormal incident in the computer communication network, to train the machine learning model;
determining a data metric threshold for the computer communication network, wherein the data metric threshold is to indicate a limit for future data metrics associated with the computer communication network;
analyzing the data metrics associated with the computer communication network;
predicting, by using the machine learning model, a first future time when the data metrics associated with the computer communication network will meet or exceed the data metric threshold value determined for the computer communication network,
wherein the machine learning model is trained by generating at least one training prediction using the set of time series data metrics and adjusting the machine learning model based on a comparison between the at least one training prediction and a known network event result; and
predicting a second future time when a network anomaly event will occur based on the network anomaly event data.

14. The system of claim 13 wherein the first future time and the second future time are proximate to each other.

* * * * *